(12) United States Patent
Lee et al.

(10) Patent No.: US 8,615,039 B2
(45) Date of Patent: Dec. 24, 2013

(54) OPTIMIZED ALLOCATION OF MULTI-CORE COMPUTATION FOR VIDEO ENCODING

(75) Inventors: Ming-Chieh Lee, Bellevue, WA (US); Walid S. I. Ali, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 536 days.

(21) Appl. No.: 12/470,236

(22) Filed: May 21, 2009

(65) Prior Publication Data

US 2010/0296575 A1  Nov. 25, 2010

(51) Int. Cl.
*H03D 3/24* (2006.01)

(52) U.S. Cl.
USPC .................................................. 375/240.02

(58) Field of Classification Search
USPC .......................................................... 375/240
See application file for complete search history.

(56) References Cited

U.S. PATENT DOCUMENTS

| | | | | |
|---|---|---|---|---|
| 5,493,513 | A | * | 2/1996 | Keith et al. .................... 709/247 |
| 5,497,197 | A | * | 3/1996 | Gove et al. .................. 348/388.1 |
| 5,500,577 | A | * | 3/1996 | Kim et al. ...................... 315/364 |
| 5,502,493 | A | * | 3/1996 | Meyer ........................ 375/240.26 |
| 5,987,180 | A | * | 11/1999 | Reitmeier ....................... 382/236 |
| 7,227,589 | B1 | * | 6/2007 | Yeo et al. ....................... 348/721 |
| 7,227,893 | B1 | * | 6/2007 | Srinivasa et al. .......... 375/240.08 |
| 7,769,084 | B1 | * | 8/2010 | Pun et al. .................. 375/240.03 |
| 2006/0078209 | A1 | * | 4/2006 | Kobayashi .................... 382/236 |
| 2006/0114996 | A1 | * | 6/2006 | Thoreau et al. .......... 375/240.16 |
| 2007/0047660 | A1 | * | 3/2007 | Mitani et al. ............. 375/240.25 |
| 2007/0133674 | A1 | * | 6/2007 | Garnier et al. ................. 375/240 |
| 2008/0008250 | A1 | | 1/2008 | Mori et al. |
| 2008/0117972 | A1 | | 5/2008 | Ramachandran et al. |
| 2008/0205526 | A1 | | 8/2008 | Kang |
| 2008/0310555 | A1 | * | 12/2008 | Kee ............................... 375/340 |
| 2009/0016430 | A1 | | 1/2009 | Schmit et al. |
| 2009/0052542 | A1 | * | 2/2009 | Romanovskiy et al. . 375/240.24 |
| 2009/0310686 | A1 | * | 12/2009 | Kee .......................... 375/240.25 |
| 2010/0226441 | A1 | * | 9/2010 | Tung et al. ............... 375/240.24 |

OTHER PUBLICATIONS

Chen, et al., "Implementation of H.264 Encoder and Decoder on Personal Computers", Retrieved at <<www.geocities.com/ykchen913/publications/H264SpecialIssueR2.pdf>>, Submitted to Special Issue on Emerging H.264/AVC Video Coding Standard, pp. 1-19.

Chien, et al., "Coding-Gain-Based Complexity Control for H.264 Video Encoder", Retrieved at <<http://vaplab.ee.ncu.edu.tw/english/pcchang/pdf/c82.pdf>>, ICIP 2008, pp. 2136-2139.

Shing, Chan Chi, "Fast Motion Estimation Algorithms in Video Coding of H.264/MPEG-4 AVC", Retrieved at <<http://www.ee.cityu.edu.hk/~lmpo/fyp/FYP_Report.doc>>, Jul. 2004, pp. 1-23.

(Continued)

*Primary Examiner* — Christopher S Kelley
*Assistant Examiner* — Deirdre Beasley
(74) *Attorney, Agent, or Firm* — Turk IP Law, LLC (57) ABSTRACT

Video encoding computations are optimized by dynamically adjusting slice patterns of video frames based on complexity of each frame and allocating multi-core threading based on the slices. The complexity may be based on predefined parameters such as color, motion, and comparable ones for each slice. Allocation is determined based on capacity and queue of each processing core such that overall computation performance for video encoding is improved.

19 Claims, 7 Drawing Sheets

(56) References Cited

OTHER PUBLICATIONS

Chen, et al., "Towards Efficient Multi-Level Threading of H.264 Encoder on Intel Hyper-Threading Architectures", Retrieved at <<http://ieeexplore.ieee.org//stamp/stamp.jsp?tp=&arnumber=01302990>>, Proceedings of the 18th International Parallel and Distributed Processing Symposium (IPDPS'04), pp. 1-10.

* cited by examiner

OPTIMIZED ALLOCATION OF MULTI-CORE COMPUTATION FOR VIDEO ENCODING

BACKGROUND

A multi-core microprocessor is one that combines two or more independent processors into a single package, often a single integrated circuit (IC). For example, a dual-core device contains two independent microprocessors and a quad-core device contains four microprocessors. A multi-core microprocessor implements multiprocessing in a single physical package. Cores in a multi-core device may share a single coherent cache at the highest on-device cache level or may have separate caches. The processors typically also share the same interconnect to the rest of the system. Each "core" independently implements optimizations such as superscalar execution, pipelining, and multi-threading. A system with N cores is effective when it is presented with N or more threads concurrently.

Multi-core machines have increasingly become the main stream of personal computers (PCs) and are now being deployed in mobile computing as well. Dual-core desktops and laptops are widely used. Quad-core processors are expected to become the next generation main stream computing devices. Heavy processing tasks like video encoding can take full advantage of the multi-core processors to greatly improve performance and help achieve the purpose of broad usage for real-time communication and entertainment applications.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to optimizing video encoding computations by dynamically changing slice patterns of video frames based on complexity of each frame and allocating multi-core threading based on the slices, thereby, exploiting multi-core processing environment's capabilities.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, video encoding computations may be optimized by dynamically changing slices in video frames based on complexity associated with each slice and encoding computations allocated accordingly. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
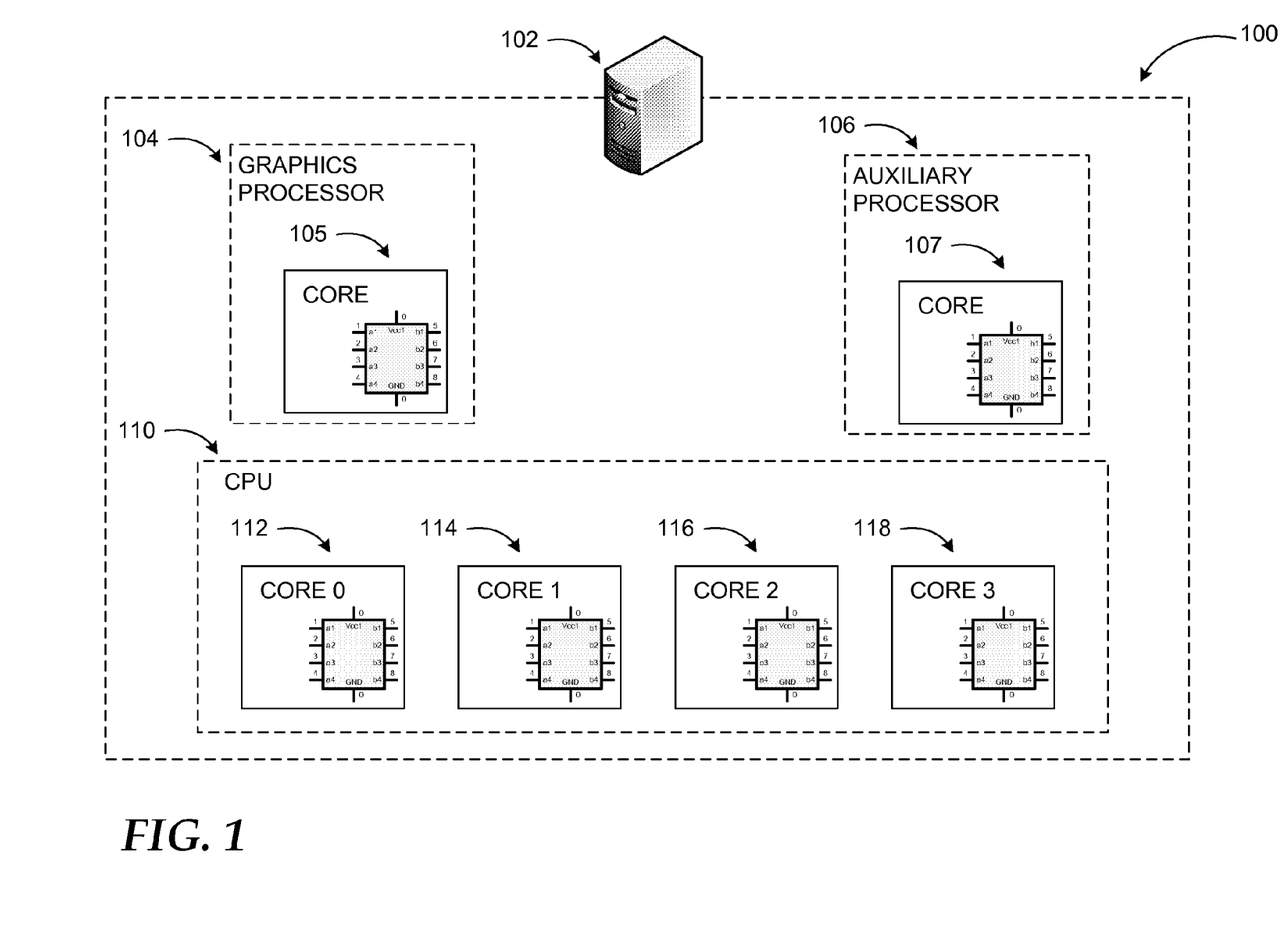
FIG. 1 is a diagram illustrating an example multi-core computing environment, where embodiments may be implemented for video encoding computations.

Referring to FIG. 1, diagram 100 of an example multi-core computing environment, where embodiments may be implemented for video encoding computations, is illustrated. Multi-core systems, which are becoming increasingly popular, provide many advantages in terms of processor power, efficiency, and the like. Furthermore, the close proximity of multiple Central Processing Unit (CPU) cores on the same die has the advantage of allowing the cache coherency circuitry to operate at a much higher clock rate than is possible if the signals have to travel off-chip. Combining equivalent CPUs on a single die significantly improves the performance of cache snoop operations. This means that signals between different CPUs travel shorter distances, and therefore those signals degrade less. These higher quality signals allow more data to be sent in a given time period since individual signals can be shorter and do not need to be repeated as often.

Assuming that the die can fit into the package, physically, the multi-core CPU designs require much less Printed Circuit Board (PCB) space than multi-chip designs. Also, a dual-core processor uses typically less power than two coupled single-core processors, principally because of the increased power required to drive signals external to the chip and because the smaller silicon process geometry allows the cores to operate at lower voltages. Moreover, the cores share some circuitry, like the L2 cache and the interface to the front side bus (FSB).

Software also benefits from multi-core architectures where code can be executed in parallel. Under most common operating systems, this requires code to execute in separate threads or processes. Each application running on a system runs in its own process so multiple applications will benefit from multi-core architectures. Each application may also have multiple threads but, in most cases, it may have to be specifically written to utilize multiple threads. Operating system software also tends to run many threads as a part of its normal operation. For example, running virtual machines benefits from adoption of multiple core architectures since each virtual machine runs independently of others and can be executed in parallel.

As shown in diagram 100, the processor block of computing device 102 may include any number of cores in its CPU, for example four. Core 0 (112), core 1 (114), core 2 (116), and core 4 (118) may process separate threads in parallel increasing the performance of the system. In addition to the CPU cores, other processing resources may include auxiliary processor 106 with its core 107, graphics processor 104 with its core 105, and similar ones. Some of the cores may be dedicated to perform specific (predefined) processes, while others may be multi-purpose. A scheduler (not shown) may schedule the threads for the processor cores based on a priority assigned by the owner application. A multi-core system according to embodiments may also include per-processor queues (PPQs) associated with each core such that threads with fixed affinity can be placed in those by the scheduler.

As mentioned previously, video encoding is a heavy processing task. To enhance video encoding performance some systems perform standard multi-tasking, where each frame of the video stream is split into fixed slices and each slice is assigned to a different processor core. However, different segments of a video frame may have dissimilar complexity. For example, one portion of the frame may be background where color and motion changes very little, if any. Another portion of the frame may include a moving image such as a speaking person. Yet another portion of the video frame may include an image where the color composition is complex or rapidly changing. Thus, processing time for each of these portions is bound to be different (e.g. high motion segments require more processing for motion search, quantization, and entropi coding).

If all segments are treated equally for assigning to distinct cores, some results will be received later than others causing an overall slowdown of the video encoding process. This difference is even more evident for real-time video encoders where more simplifications are done for slow motion parts and there tend to be more slow-motion regions (head and shoulder) for video conferencing content.

According to some embodiments, the video frames are divided dynamically into slices based on the complexity of the frame. That is, the slice pattern might change from frame to frame. Since the complexity of a current frame cannot be known until the processing and computation is done, the complexity of the current frame also cannot be used as the indicator. However, there is a high degree of similarity and redundancy between consecutive frames. Thus, the complexity of the previous frame is used as the basis for selecting slice patterns.

While the example system in FIG. 1 has been described with specific components such as CPU, auxiliary processor, and graphics processor, embodiments are not limited to this system of the example components and configurations. A computing device with optimized allocation of multi-core computation for video encoding may be implemented in other systems and configurations employing fewer or additional components using the principles described herein.

Figure 2:
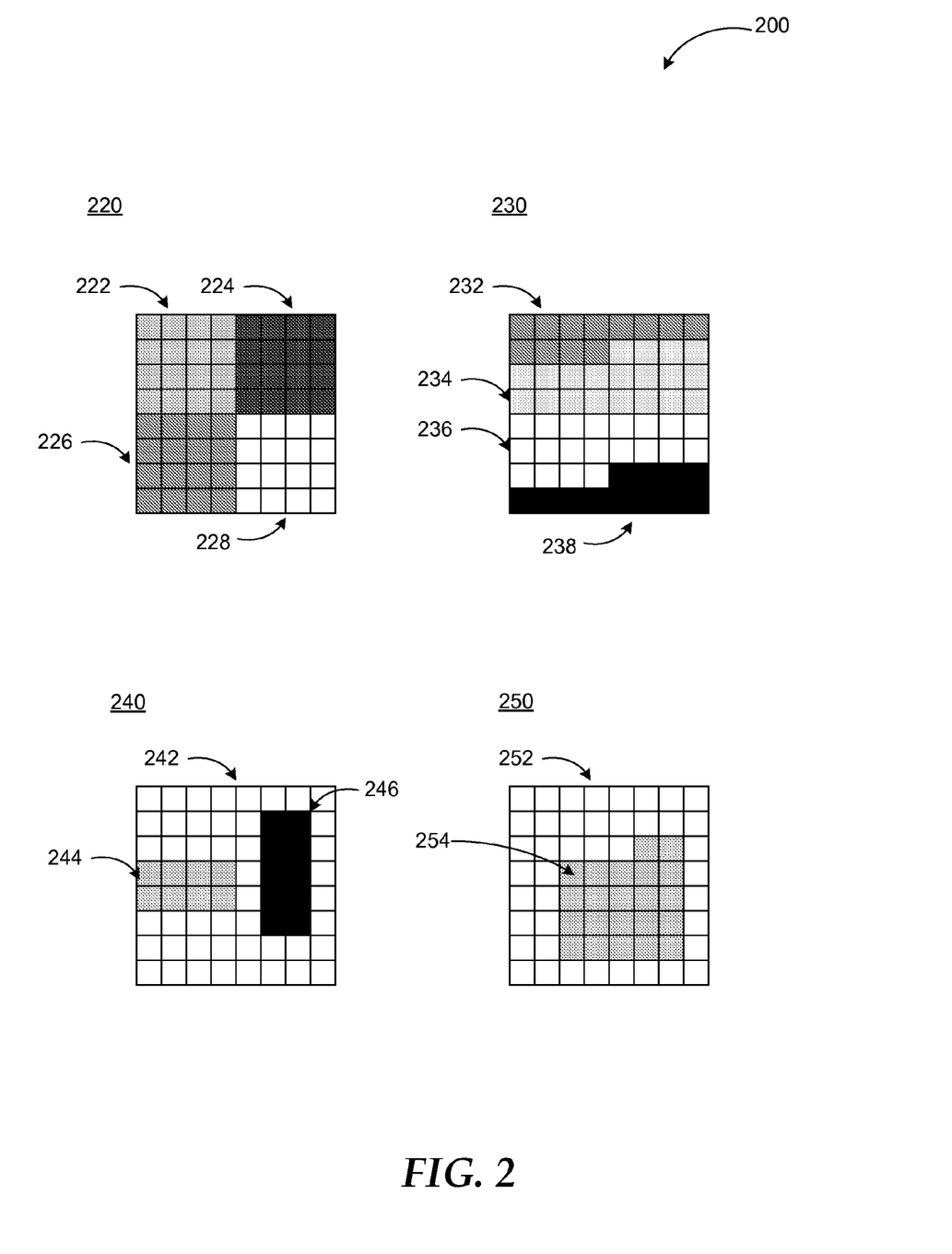
FIG. 2 is a diagram illustrating example segmentations of video frames into macroblocks in a system according to embodiments.

FIG. 2 is a diagram illustrating example segmentations of video frames into macroblocks in a system according to embodiments. In video processing, a frame is one of the many still images, which compose the complete moving picture. When the moving picture is displayed, each frame is flashed on a screen for a short time (usually $\frac{1}{24}$th, $\frac{1}{25}$th or $\frac{1}{30}$th of a second) and then immediately replaced by the next one. Persistence of vision blends the frames together, producing the illusion of a moving image. The video frame is also sometimes used as a unit of time, being variously $\frac{1}{24}$, $\frac{1}{25}$ or $\frac{1}{30}$ of a second, so that a momentary event might be said to last 6 frames.

In video compression, a video frame is compressed using different algorithms with different advantages and disadvantages, focused mainly on the amount of data compression. These different algorithms for video frames are called picture types or frame types. Three major picture types used in the different video algorithms are I, P, and B. I frames are the least compressible but do not require other video frames to decode. An "I-frame" is an Intra-coded picture, in effect a fully-specified picture, like a conventional static image file. A "P-frame", Predicted picture (also referred to as delta frame), holds only the changes in the image from a previous frame. For example, in a scene where a car moves across a stationary background, only the car's movements need to be encoded. The encoder does not need to store the unchanging background pixels in the P-frame, thereby, saving data space. A "B-frame", Bi-directional predictive picture, saves even more data space by using differences between the current frame and both the preceding and following frames to specify its content. Pictures that are used as a reference for predicting other pictures are referred to as reference pictures. P-frames and B-frames hold only part of the image information, so they need less space to store than an I-frame, and thus improve video compression rates.

A slice is a spatially distinct region of a picture that is encoded separately from any other region in the same picture. Thus, references may be made to I-slices, P-slices, and B-slices instead of I-frames, P-frames, and B-frames. It should be noted that the term picture is a more general term than frame, as a picture can be either a frame or a field. A frame is a complete image captured during a known time interval, and a field is the set of odd-numbered or even-numbered scanning lines composing a partial image.

Since I-frames are coded without reference to any other frames except themselves, they typically require more bits to encode compared to other types and are, therefore, utilized infrequently by video conferencing or similar systems relying on reduced and rapid data exchange. P-frames require the prior decoding of some other frame(s) in order to be decoded, may contain both image data and motion vector displacements and combinations of the two, and typically require fewer bits for encoding than I-frames. B-frames can use one or more previously-decoded frames as references during decoding, and can have any arbitrary display-order relationship relative to the frame(s) used for its prediction. Therefore, B-frames typically require fewer bits for encoding than I- or P-frames.

Frames may also be segmented into macroblocks, and individual prediction types can be selected on a macroblock basis rather than being the same for the entire frame. The rules for defining frame types are defined as: I-frames contain only intra macroblocks; P-frames contain either intra macroblocks or predicted macroblocks; and B-frames contain intra, predicted, or bi-predicted macroblocks. The picture can be further segmented into sequences of macroblocks called slices (see above), and instead of using I-, B- and P-frame type selections, the encoder may choose the prediction style distinctly on each individual slice.

A macroblock may represent a block of 16 by 16 pixels. Each macroblock may contain 4 Y (luminance) blocks, 1 Cb (blue color difference) block, and 1 Cr (red color difference) block. Macroblocks may also be subdivided further into smaller blocks, called partitions. A macroblock may be coded as ADDR:TYPE:QUANT:VECTOR:CPB:blocks, where ADDR is the address of the block in the image, TYPE identifies the type of macroblock (I, P, or B), QUANT is the quantization value to vary quantization, VECTOR is the motion vector, and CBP is the coded block pattern—a bit mask indicating if the macroblock matches well or poorly—. The blocks are individual Y, Cr, and Cb block values.

As mentioned above, a frame can be divided in different scan patterns of the macroblocks. Some of those are standardized, ranging from rigid patterns to random ones that allow full flexibility to the user. Four example macroblock patterns are displayed in diagram 200. Frame 220 is divided into four equal (square) macroblocks 222, 224, 226, and 228. Such a pattern may be employed for I type frames and is relatively rigid. Diagram 230 illustrates a so-called type 0 pattern with macroblocks 232, 234, 236, and 238, which use run lengths repeated to fill the frame. Only those run lengths have to be known to rebuild the image on the decoder side.

Diagram 240 is an example of type 2 pattern, which is used to mark rectangular areas, also called regions of interest (242, 244, and 246). In this case the coordinates top-left and bottom-right of the rectangles may be saved in the image map. Diagram 250 is an example of type 3 pattern using macroblocks 252 and 254. This is a dynamic type that lets the slice groups grow and shrink over the different pictures in a cyclic way. Only the growth rate, the direction and the position in the cycle have to be known. More dynamic macroblock patterns allow determination of complexity with higher granulation and enable enhanced optimization of video encoding processes in a system according to embodiments.

Of course other types of macroblock patterns and image divisions may be employed to optimize allocation of video encoding processes in a multi-core environments using the principles described herein.

Figure 3:
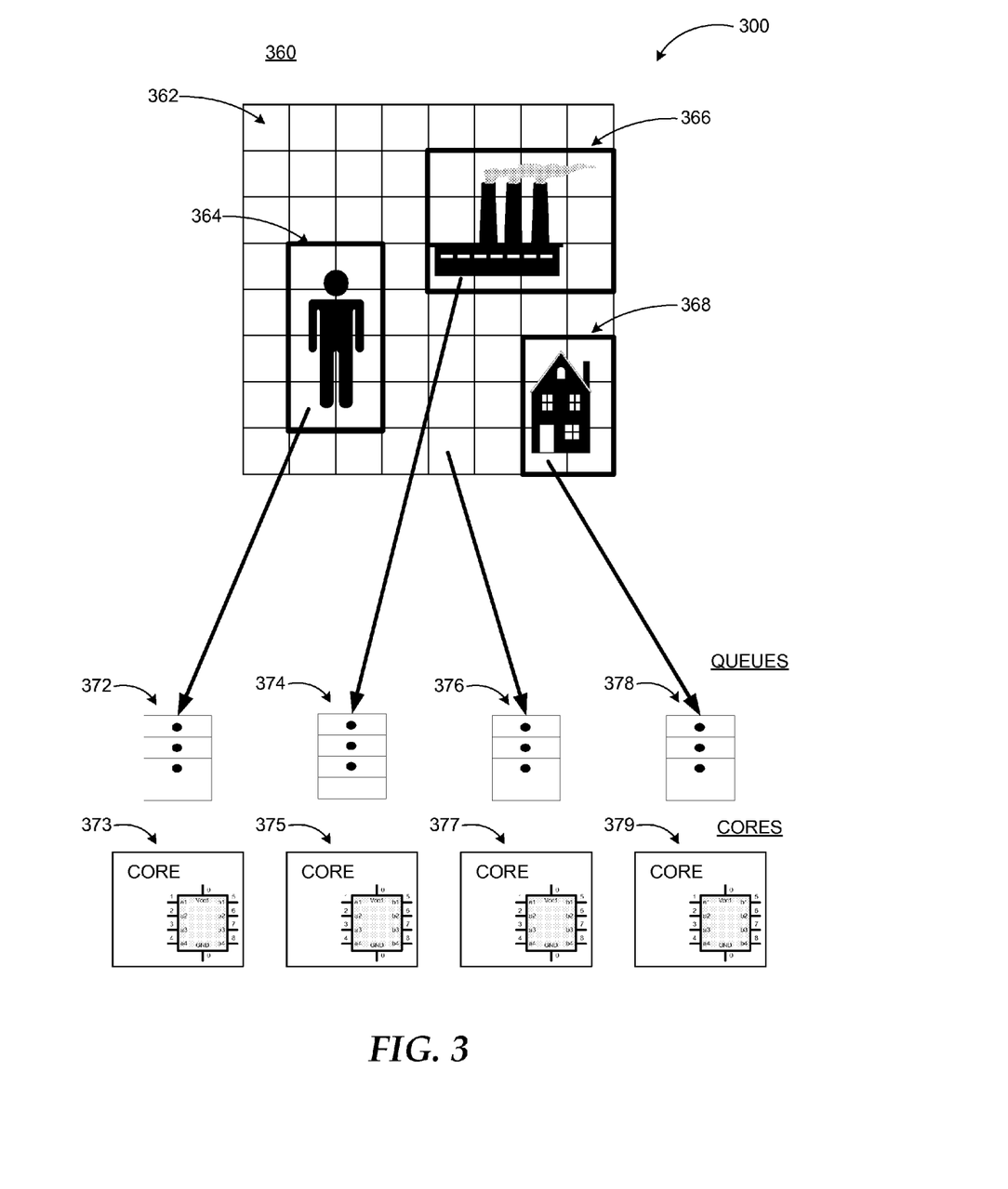
FIG. 3 is conceptual diagram illustrating threading of various macroblocks of a video frame to optimize video encoding according to embodiments.

FIG. 3 is conceptual diagram illustrating threading of various macroblocks of a video frame to optimize video encoding according to embodiments. According to some embodiments, the slice division is changed dynamically based on the complexity of the frame instead of employing fixed slice patterns. Complexity of processing a macroblock with higher motion, color composition, or similar characteristics is higher. Thus, processing time for such macroblocks is also longer. Moreover, high motion (complex color) parts may differ from frame to frame. To divide a current frame, the macroblock complexity of the previous frame is used as the basis. Since the number of cores is a power of 2 (2, 4, 8, etc.), binary division may be used to divide the frames.

As illustrated in diagram 300, frame 360 may be dynamically divided into slices 362, 364, 366, and 368 based on the macroblock complexity and each one submitted to queues 372, 372, 376, and 378 for the processor cores 373, 375, 377, 379 such that processing time is evenly distributed and overall processing for the frame optimized.

In practical implementations where complexity based allocation is not employed, performance gain from 1 to 2 cores is about 15 to 25%, while theoretically 50% gain should be feasible in an optimal case. This is mainly due to the fact that the high-complexity macroblocks are not evenly allocated to slices and thus cores. So, one core finishes the encoding job faster than the other thread, and it needs to stay idle waiting for the other slice/core to finish the encoding job so that they can merge to finish the remaining encoding job for the frame.

While encoding the current frame, the complexity of all macroblocks are recorded. According to one embodiment, the exact machine cycles may be used for the complexity measurement. However, it may take a long period to get the accurate machine cycles, especially when the calculation gets down to the pixel level. Therefore, an estimation algorithm may be employed to further optimize the process. For example, a Sum of Absolute Difference (SAD) algorithm may be used as representation for macroblock content complexity. The SAD values for each macroblock may then be added for the entire macroblock row.

According to an example scenario, the complexity numbers, or SAD numbers as an approximation, may be assumed to be $C_0$ to $C_{n-1}$ where n is the number of macroblock rows. $C_i$ may be used to determine how to divide the next frame into slices and thus cores. A system according to embodiments aims to evenly distribute $C_0$ to $C_{n-1}$, into m parts where m is the number of cores. Since the number of cores is a power of two, a binary approach may be used to find the optimal division. That is, the macroblock row location may be found for the optimal division into two such that $C_0$ to $C_{n-1}$ are evenly divided. According to another embodiment, the macroblock row d where the summation of $C_0$ to $C_{d-1}$ and summation of $C_d$ to $C_{n-1}$ are the closest may also be used for the division location for a 2-slice case. Next, an iterative process may be performed in each part of the two slices until the whole frame is divided into the desired number of slices.

The above discussed scenarios, example systems, frames, slices, and division approaches are for illustration purposes. Embodiments are not restricted to those examples. Other forms of frame divisions, complexity computations, and allocations may be used in implementing an optimized allocation of multi-core computation for video encoding in a similar manner using the principles described herein. For example, characteristics other than motion or color composition may be used to determine complexity, any form of shape for the images such as rectangle, square, or even random may be utilized. Moreover, the example systems are described above with specific core numbers and queue configuration, embodiments are not so limited. Optimization of multi-core allocation for video encoding may be implemented using any number of cores and/or queues.

Figure 4:
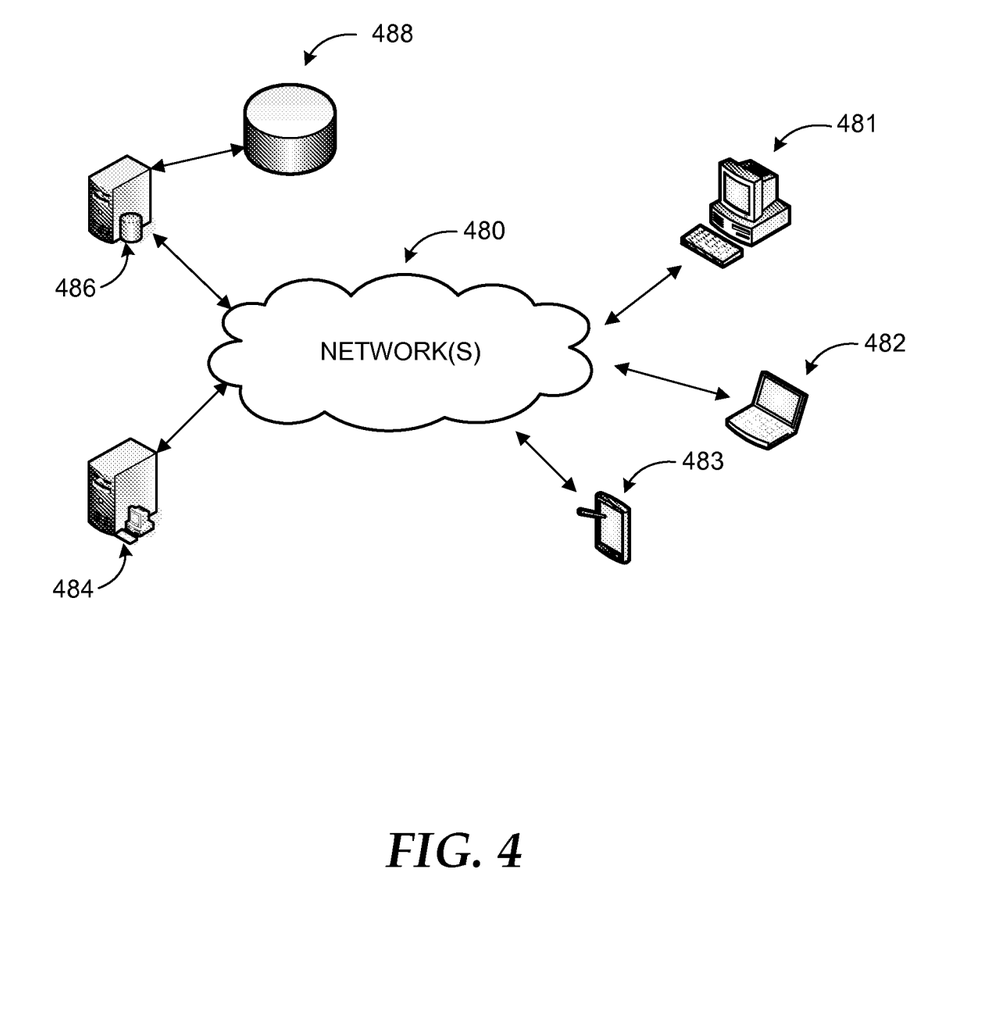
FIG. 4 is a networked environment, where a system according to embodiments may be implemented.

FIG. 4 is an example networked environment, where embodiments may be implemented. Optimized video encoding in multi-core systems may be implemented via software executed over one or more servers (e.g. server 484) such as a hosted service. The system may facilitate video exchange between client applications on individual computing devices such as a desktop computer 481, a laptop computer 482, and handheld computer 483 ('client devices') through network(s) 480.

Any one of the computing devices in the figure, such as client devices 481-483 or server 484 may be multi-core devices implementing optimized allocation of multi-core computation for video encoding. Each computing device may have its own operating system or share one, and each device may execute applications that run locally or interact with other devices/applications. Thus, the cores of the processors of each device may receive threads from the operating systems and/or applications running locally or on other devices.

Schedulers for the processors of each device or the system may place the threads on the processor queues based on the complexity of slices of each frame as described above. Results of processed threads are then provided by the respective cores to the submitting operating system or application. Data associated with encoding the video frames may be stored in one or more data stores (e.g. data store 488), which may be managed by any one of the other computing device or by database server 486.

Network(s) 480 may comprise any topology of servers, clients, Internet service providers, and communication media. A system according to embodiments may have a static or dynamic topology. Network(s) 480 may include a secure network such as an enterprise network, an unsecure network such as a wireless open network, or the Internet. Network(s) 480 may also coordinate communication over other networks such as PSTN or cellular networks. Network(s) 480 provides communication between the nodes described herein. By way of example, and not limitation, network(s) 480 may include wireless media such as acoustic, RF, infrared and other wireless media.

Figure 5:
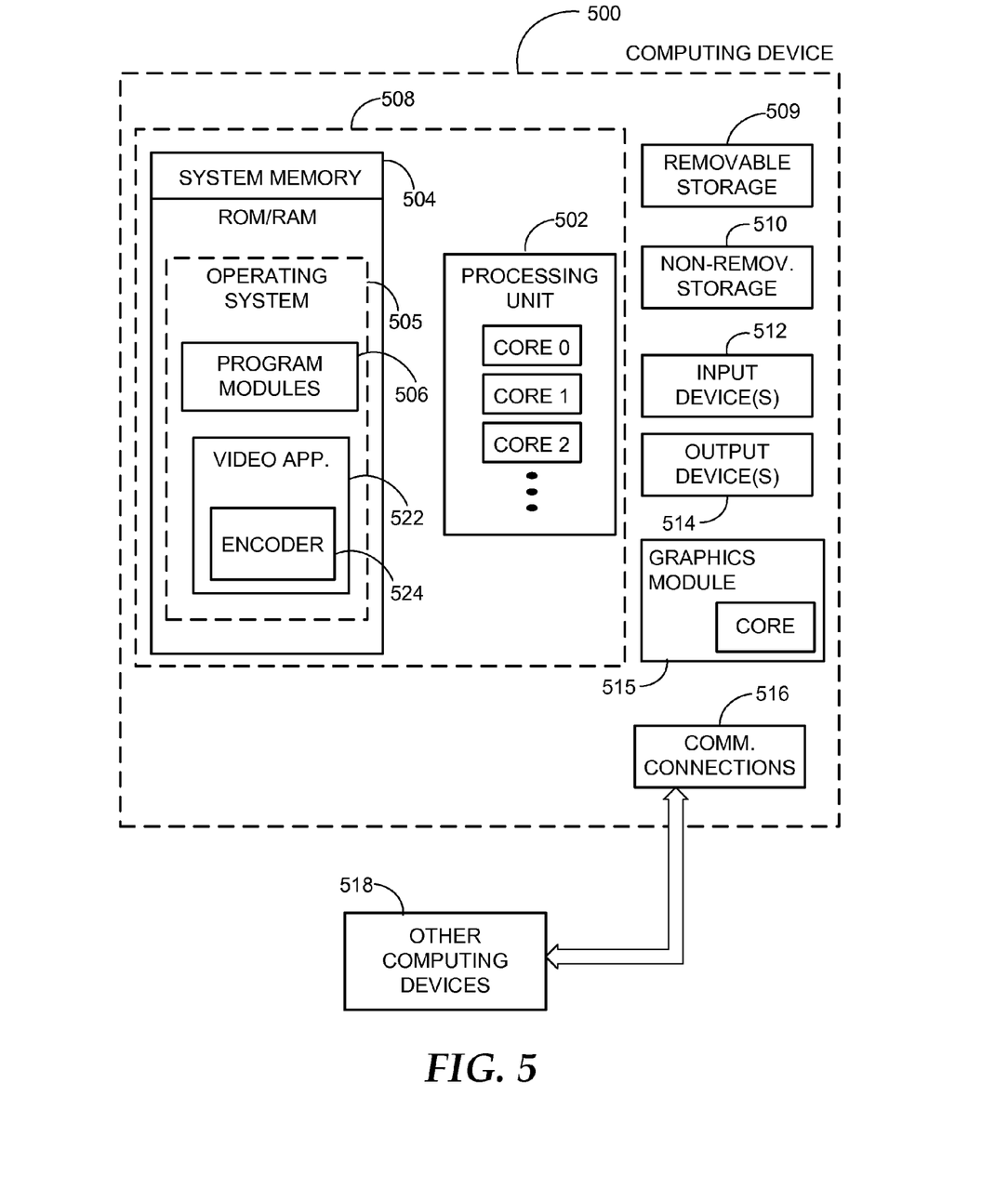
FIG. 5 is a block diagram of an example computing operating environment, where embodiments may be implemented.

Many other configurations of computing devices, applications, data sources, and data distribution systems may be employed to implement an optimized video encoding in multi-core systems. Furthermore, the networked environments discussed in FIG. 5 are for illustration purposes only. Embodiments are not limited to the example applications, modules, or processes.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device with multi-core processors including desktop or mobile computers, smart cellular phones, embedded systems, and comparable ones with at least one processing unit 502 and system memory 504. Processing unit 502 includes multiple cores that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, video application 522 and encoder module 524.

Video application 522 may dynamically divide video frames into slices based on complexity levels computed for each frame (based on previous frame) and place threads in individual processor queues associated with the processing unit 502 as discussed earlier. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, other directory or policy servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing device 500 may further include a graphics module 515 with its own processor core. The graphics module 515 may be used for dedicated processing tasks or share video encoding processing along with the cores of processing unit 502.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
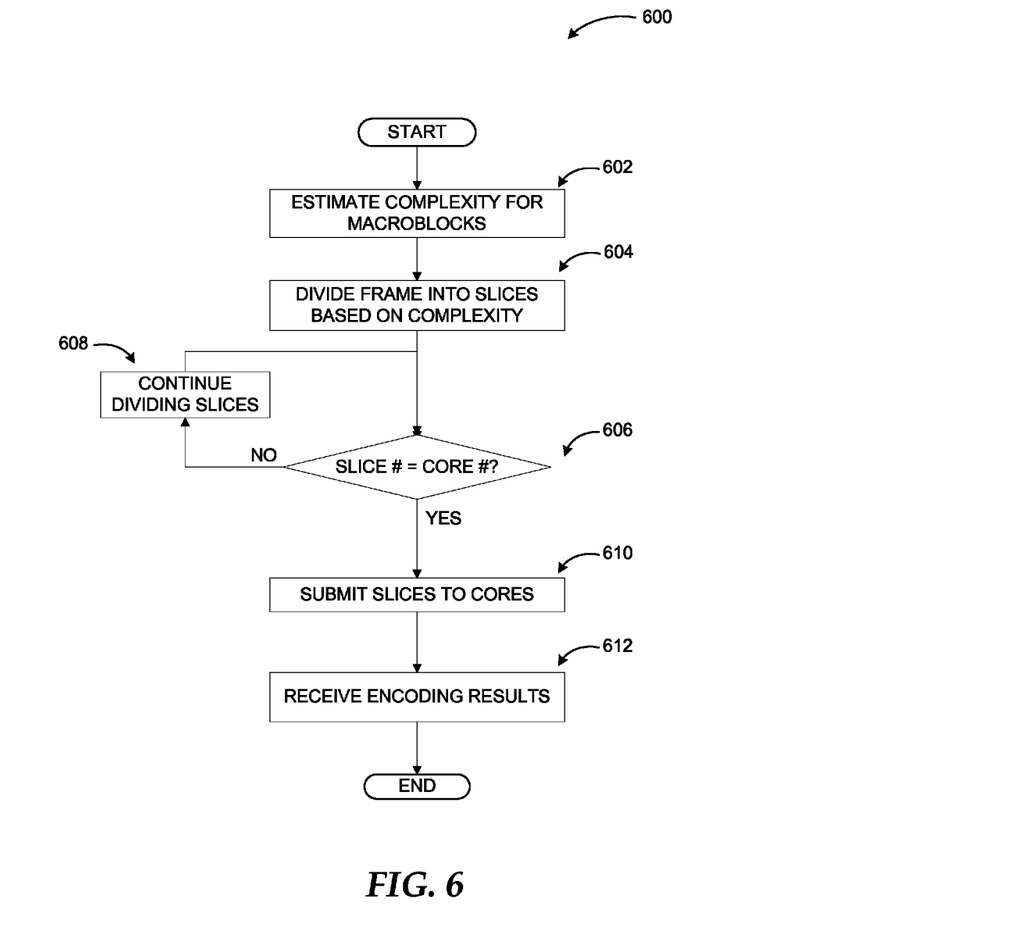
FIG. 6 illustrates a logic flow diagram for a process of optimized video encoding in a multi-core environment according to embodiments.

FIG. 6 illustrates a logic flow diagram for process 600 of optimizing video encoding in a multi-core environment according to embodiments. Process 600 may be implemented in any computing device with multiple core processors and graphics processing capabilities.

Process 600 begins with operation 602, where complexity of macroblocks is determined. The complexity may be based on motion, color composition, or similar characteristics of the image(s) within the frame. At subsequent operation 604, the frame is divided into slices based on the complexity. This is followed by a determination at decision operation 606 whether a number of slices is equal to a number of available processor cores. If the numbers do not match, the frame is continued to be divided at operation 608 until the numbers are equal. If the numbers match, the slices are submitted to the cores for processing at operation 610. Encoding results are received at operation 612 to complete the process. Upon receiving encoding results from all available processor cores, the application may move to a next frame in a video stream for estimation of complexity and division of the next frame into slices.

Figure 7:
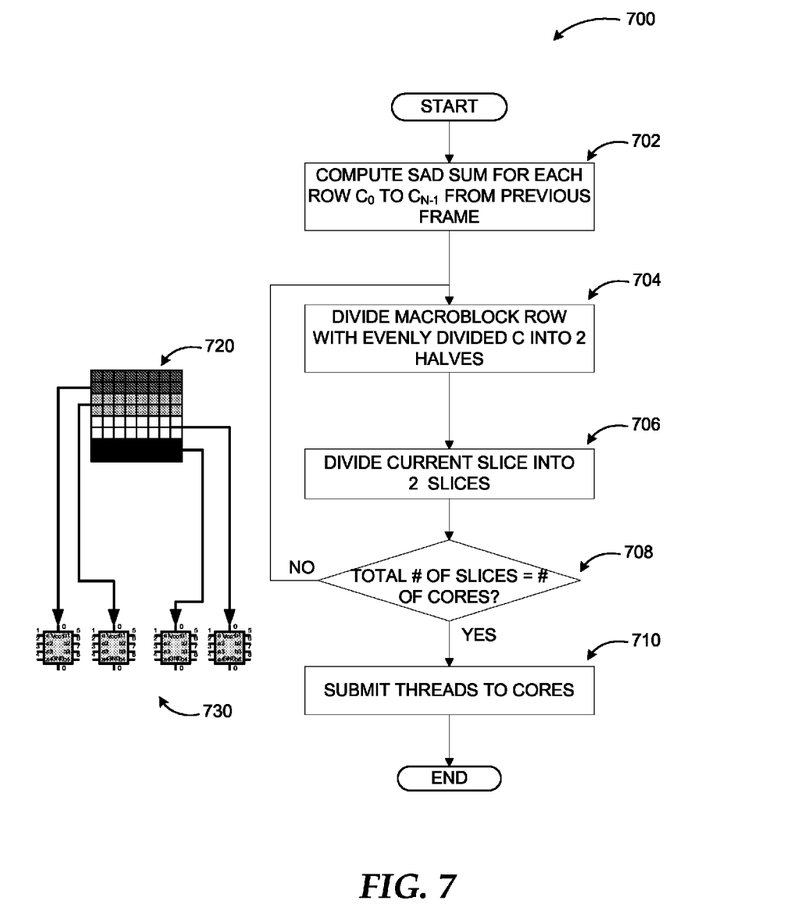
FIG. 7 illustrates a logic flow diagram for a process of a specific example video encoding optimization in a multi-core environment according to embodiments.

FIG. 7 illustrates a logic flow diagram for process 700 of a specific example video encoding optimization in a multi-core environment according to embodiments. Process 700 may also be implemented in any computing device with multiple core processors and graphics processing capabilities.

Process 700 begins with operation 702, where a Sum of Absolute Difference (SAD) algorithm is employed as an estimation algorithm for each row ($C_0$ to $C_{n-1}$) of macroblocks from previous frame. As mentioned previously, current frame's complexity cannot be determined until the computations are performed. Therefore, previous frame(s) may be used as reference. At operation 704, a macroblock row with evenly divided C is divided into two halves. Subsequently, the current slice is divided into two slices at operation 706. The division of the current slice may be based on selecting a macroblock row where a sum of SAD values before the macroblock row and a sum of SAD values after the macroblock row are closest, and dividing the current slice into two further slices by setting the selected macroblock row as slice boundary. This may begin with only two slices in the frame and iteratively continue for all slices.

At decision operation 708, a determination is made whether the total number of slices is equal to the number of available cores. If the numbers are not equal processing returns to operation 704 for further division of the macroblock rows. Otherwise, the threads for the slices are submitted to the cores for processing. A priority of each macroblock processing task for determining its place in a processing core queue may be based on a priority designated by the submitting video application, a time of arrival, a processing core availability, a number of pending tasks, and/or a memory condition.

The allocation of macroblock rows to different cores of the system are also conceptually illustrated by the rows of frame 720 being assigned to cores 730. As discussed above, the assignment may be made based on a number of factors and not necessarily in order.

The operations included in processes 600 and 700 are for illustration purposes. Optimized video encoding computations in a multi-processor environment may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for optimizing video encoding allocations in a multi-core processor system, the method comprising:
   estimating a complexity of macroblocks within a current frame based on macroblocks of a previous frame based on a motion content and a color composition of each macroblock;
   dividing the current frame into slices of distinct shapes based on the estimated complexity of the macroblocks such that processing time at respective processor cores is substantially evenly distributed and overall processing for the current frame is optimized, wherein each slice comprises a sequence of macroblocks;
   employing the slices using a growth rate, a direction, and a position of a cycle used to one of: grow and shrink the slices over the current frame;
   if a number of slices within the current frame is equal to a number of available processor cores, submitting the macroblocks for the slices in the current frame to the available processor cores for processing; else
   continuing to divide the current frame into slices until the number of slices within the current frame is equal to the number of available processor cores.

2. The method of claim 1, further comprising:
   receiving processing results from the available processor cores; and
   upon receiving the results from all processor cores, moving to a next frame for estimation of complexity and division of the next frame into slices.

3. The method of claim 1, wherein the slices of the current frame are processed by the available processor cores for encoding a video stream.

4. The method of claim 1, wherein the complexity of the macroblocks within the current frame is estimated based on the macroblocks of at least two previous frames.

5. The method of claim 1, wherein the slices are configured to divide the current frame into equally sized areas.

6. The method of claim 1, wherein a shape of the slices includes at least one from a set of: a rectangle, a square, and a random shape.

7. The method of claim 1, wherein the complexity is determined based on at least one of: a motion content and a color composition of the macroblocks.

8. The method of claim 1, wherein the current frame is divided into slices using a binary division.

9. The method of claim 1, wherein the complexity of the macroblocks of the current frame is estimated by:
   Sum of Absolute Difference (SAD) values for each macroblock in a macroblock row; and
   adding the SAD values for the entire macroblock row.

10. A system for optimizing video encoding allocations in a multi-core processor environment, the system comprising:
    a memory;
    a processor coupled to the memory, comprising a plurality of distinct processing cores, the processor arranged to execute a video encoding application, the video encoding application configured to:
estimate a complexity of macroblocks within a current frame by predicting the current frame based on macroblocks of a previous frame, wherein the complexity is based on a motion content and a color composition of each macroblock and a prediction type is based on individual macroblocks;
iteratively determine a number of slices within the current frame based on the estimated complexity of the macroblocks such that a number of slices in the current frame is equal to a number of available processing cores, each slice having a distinct shape and a distinct area, and comprising at least one row of macroblocks;
employ the slices using a growth rate, a direction, and a position of a cycle used to one of: grow and shrink the slices over the current frame;
submit the slices in the current frame to the available processor cores for processing; and
upon receiving encoding results from all available processor cores, move to a next frame in a video stream for estimation of complexity and division of the next frame into slices.

11. The system of claim 10, wherein the number of slices is determined by:
computing Sum of Absolute Difference (SAD) values for the macroblocks in each macroblock row;
selecting a macroblock row where a sum of SAD values before the macroblock row and a sum of SAD values after the macroblock row are closest; and
dividing the current frame into two slices by setting the selected macroblock row as slice boundary.

12. The system of claim 11, wherein the video encoding application is further configured to:
iteratively re-select another macroblock row in each slice where a sum of SAD values before the other macroblock row and a sum of SAD values after the other macroblock row are closest; and
divide each slice into further two slices by setting the selected other macroblock row as new slice boundary until a number of slices is equal to a number of available processing cores.

13. The system of claim 10, wherein the processor is part of one of: a desktop computer, a mobile computer, a smart phone device, and an embedded system.

14. The system of claim 10, further comprising an additional processor with at least one processing core, wherein at least one of the macroblock processing tasks are performed by the at least one processing core of the additional processor.

15. The system of claim 10, wherein a priority of each macroblock processing task for determining its place in a processing core queue is based on at least one from a set of: a priority designated by the submitting video encoding application, a time of arrival, a processing core availability, a number of pending tasks, and a memory condition.

16. A method to be executed at least in part in a multi-core processor system for optimizing video encoding allocations, the method comprising:
estimating a complexity value of macroblocks within a current frame based on macroblocks of a previous frame, wherein the complexity value is based on a motion content and a color composition of each macroblock;
iteratively determining a number of slices comprising a sequence of macroblocks within the current frame based on the estimated complexity value of the macroblocks such that a sum of complexity values of macroblocks within a slice is similar to a sum of complexity values of macroblock within an adjacent slice and processing time at respective processor cores is substantially evenly distributed and overall processing for the current frame is optimized, wherein a prediction type for the current frame is determined based on individual slices, the slices have distinct shapes and areas, and a number of slices in the current frame is equal to a number of available processing cores;
employing the slices using one of:
run lengths repeated to fill the current frame for rebuilding the current frame;
a growth rate, a direction, and a position of a cycle used to one of: grow and shrink the slices over the current frame;
submitting the slices in the current frame to the queues for the available processor cores, wherein a priority of each slice processing task is based on at least one from a set of: a priority designated by a submitting video application, a time of arrival, a processing core availability, a number of pending tasks, and a memory condition; and
upon receiving encoding results for the slice processing tasks from all available processor cores, moving to a next frame in a video stream for estimation of complexity and division of the next frame into slices.

17. The method of claim 16, wherein iteratively determining the number of slices includes performing a binary division within the frame until the number of slices in the current frame is equal to the number of available processing cores.

18. The method of claim 16, wherein the slices within the frame have a random shape.

19. The method of claim 16, wherein the current frame is one of: a Predictive frame (P-frame) and a Bi-directional predictive frame (B-frame) in the video stream.

* * * * *